E. BROWN.
AUTOMOBILE HEATING APPLIANCE.
APPLICATION FILED APR. 30, 1917.
1,257,068.
Patented Feb. 19, 1918.
2 SHEETS—SHEET 2.
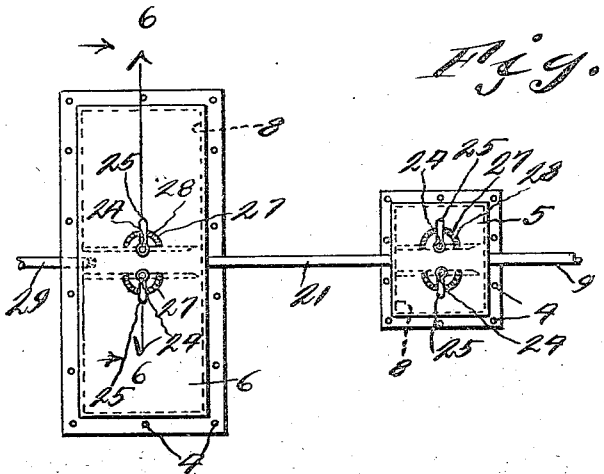
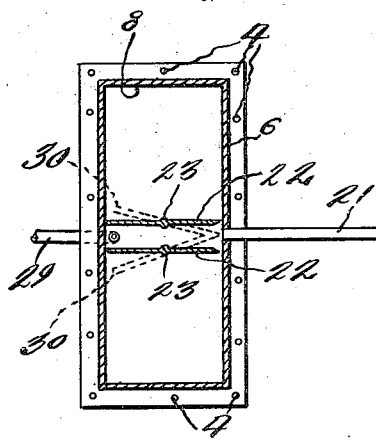
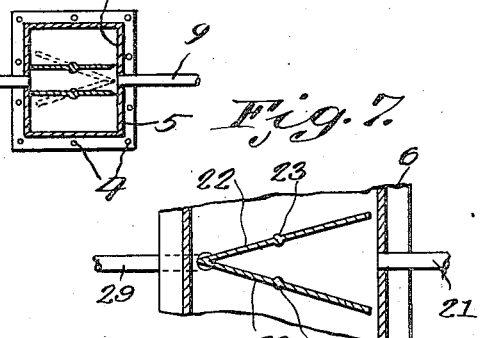
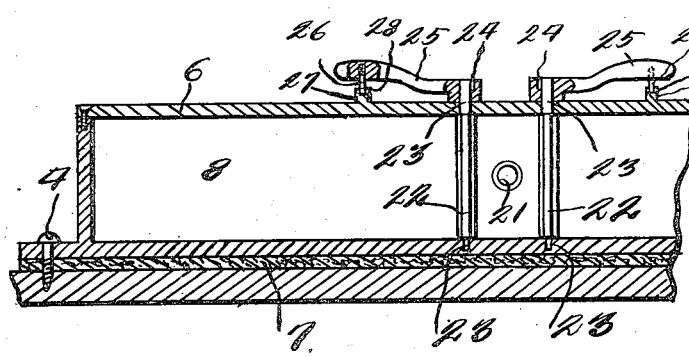

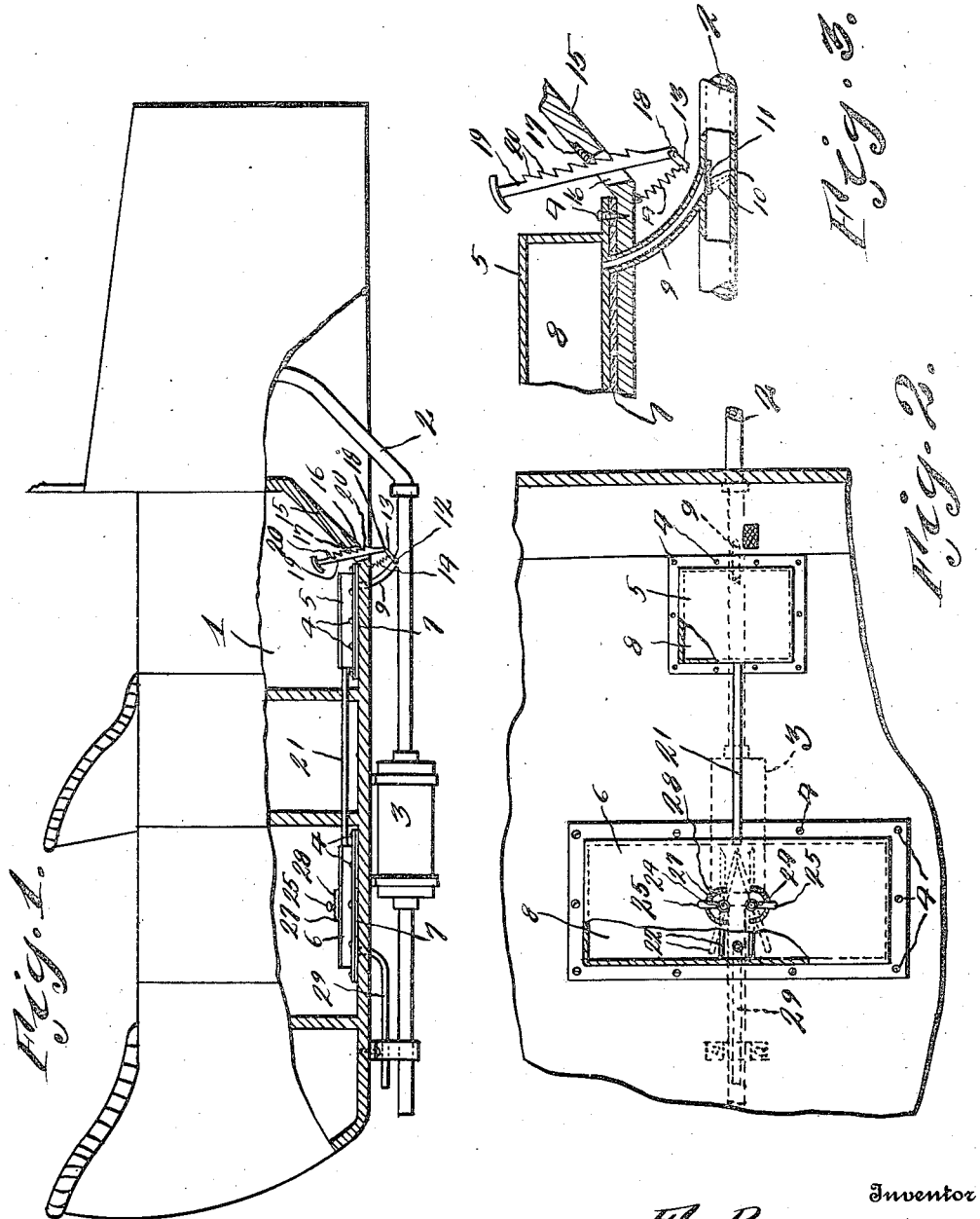

UNITED STATES PATENT OFFICE.

EUGENE BROWN, OF EARLSBORO, OKLAHOMA.

AUTOMOBILE-HEATING APPLIANCE.

1,257,068.  Specification of Letters Patent.  Patented Feb. 19, 1918.

Application filed April 30, 1917. Serial No. 165,585.

*To all whom it may concern:*

Be it known that I, EUGENE BROWN, a citizen of the United States, residing at Earlsboro, in the county of Pottawatomie, State of Oklahoma, have invented a new and useful Automobile-Heating Appliance; and I do hereby declare the following to be a full, clear, and exact description of the invention, such as will enable others skilled in the art to which it appertains to make and use the same.

This invention relates to an improved heating appliance for automobiles and an object of the invention is to provide an apparatus of this kind for utilizing the exhaust from the automobile engine as the source of heat.

A further object of the invention is to provide means to be actuated by the foot of the operator, whereby the exhaust may be deflected through the heating elements.

A further object of the invention is the provision of a pair of heating elements secured to the floor of the automobile body and having elongated shallow heat chambers to collect the exhaust from the manifold, whereby heat may radiate, and hence keep the feet of the occupants warm.

Another object of the invention is the provision of means on the interior of the chambers of the heating elements for baffling the heating medium to the opposite ends of the chambers, whereby the heat may radiate substantially from the entire surface of the heater.

A further object of the invention is to provide improved baffling means for the exhaust gas or heating medium, the same being so arranged and constructed and capable of various adjustments, whereby the heat may be allowed to pass out slowly, thereby intensifying the heat that may radiate.

In practical fields, the details of construction may necessitate alterations falling within the the scope of what is claimed.

The invention comprises further features and combination of parts, as hereinafter set forth, shown in the drawings and claimed.

In the drawings:—

Figure 1 is a view partly in side elevation and partly in section, showing the improved heater as applied to an automobile, and connected to the exhaust manifold.

Fig. 2 is a plan view of the heating appliance, with the walls of the heating chambers partly in section.

Fig. 3 is an enlarged detail sectional view of the means for deflecting the exhaust from the manifold into the heating appliance.

Fig. 4 is a plan view of the heating appliance showing the improved baffling means for the exhaust gas, whereby said gas may pass slowly from the rear end of the appliance.

Fig. 5 is a sectional plan view of the structure shown in Fig. 4.

Fig. 6 is an enlarged sectional view on line 6—6 of Fig. 4.

Fig. 7 is a detail sectional view of a portion of the rear heater casing showing the baffle plate adjusted so as to converge toward the rear of the casing.

Referring more especially to the drawings, 1 designates a conventional form of a body of an automobile, and 2 denotes the exhaust manifold from the engine, and 3 the usual muffler. Secured by suitable bolts 4 to the floor or bottom of the body, are the heating elements 5 and 6. The heating elements are comparatively flat, as shown clearly in the drawings, and interposed between said elements and the floor or bottom of the body, are sheets of asbestos 7, in order to protect the bottom or the floor of the car from intense heat. The casings of the heaters are provided with shallow chambers 8, in which the gas from the exhaust manifold may collect. The heater 5 is shorter than the heater 6, and is secured to the floor of the car in front of the operator's seat. The heating elements may be made in different sizes and proportions, depending entirely upon the requirements. Merging from the exhaust manifold 2 and curving upwardly and rearwardly, is a by-pass or branch pipe or tube 9, which connects to and communicates with the heating element 5, whereby the exhaust from the manifold may be by-passed into the heating appliance. Where this branch or by-pass pipe 9 connects to the exhaust manifold, a suitable valve 10 is pivoted, as shown at 11. The shaft or pin 12 on which the gate valve is carried, is extended laterally, and secured to this extended end is an arm 13. Connected to the arm 13 is a spring 14, which in turn is connected to the bottom of the body of the automobile, thereby holding the gate valve raised to normally close the by-pass or branch pipe 9. The inclined portion 15 of the floor or the bottom of the car has an opening 16. Secured to the inclined portion, adjacent the opening is a plate 17. Pivoted to the free end of the arm 13, as shown at 18, is a foot lever 19, designed to be depressed by the foot of the operator. The depressible foot lever is supplied with a series of ratchet teeth 20. The lever 19 extends through the opening 16, and when the lever is depressed, it may be so manipulated by the foot, that any one of the teeth may engage the edge portion of the plate 17, thereby holding the valve down across the passes of the exhaust manifold. Hence, it is to be noted that as the exhaust gas leaves the engine, not shown, of the automobile, it is deflected or baffled into the by-pass or branch pipe 9, into the forward heating element 5, in order to circulate throughout the chamber of said element, hence cause thorough radiation of the heat. A suitable pipe or tube 21 connects the heating elements 5 and 6, thereby putting their chambers in communication, so that the gas from the heating element 5 may pass slowly into the chamber of the heating element 6, from which heat also radiates for the occupants of the rear seat. Owing to it having been found practical to construct the heating element 6 of greater width than the heating element 5, since it is farther from the engine of the automobile, means is provided for deflecting the heating medium to the ends of the chamber of the heater 6. This deflecting means comprises a pair of baffle plates 22, which are mounted upon the rocking pins 23. These pins are arranged vertically and mounted in bearings on the casing of the heater 6. Keyed at 24 to the upper ends of said pins, are suitable levers or handles 25, the end portions of which are provided with downwardly extending spring tensioned pins 26. Formed upon the upper wall of the casing of the heater 6 are raised segment ribs 27 provided with teeth 28. Each tooth or serration is substantially V-shaped in cross section, so that the spring retained pins 26 may ride thereover. The rear portion of the bottom of the casing of the heater 6 has attached thereto an outlet pipe or tube 29, and through which the utilized heating medium from the chamber of the heater 6 may pass to the atmosphere at the rear of the automobile. The outlet pipe 29 is substantially alined with the connecting pipe 21, as shown in Fig. 2 and in the sectional plan view of Fig. 5. The pivoted baffle plates 22 are so spaced from each other as to provide a baffle plate on each side of the passage of the heating medium from the pipe or tube 21, when said baffle plates are in parallelism, as shown in Fig. 5. By this arrangement, there is afforded, a substantially direct connection between the pipe 21 and the pipe 29, so that after utilizing the heat in the heater 5, it may pass directly to the atmosphere. In order to deflect the heat to the opposite ends of the chamber of the heater 6, and to so retain the heating medium as to allow it to pass off slowly or gradually through the pipe 29, the baffle plates may be adjusted, as shown in dotted lines in Fig. 5. If desired, one of said baffle plates may be allowed to remain transverse of the heater 6, while the other baffle plate may be adjusted at an angle to the transverse plate so as to deflect the heat to one end of the heater, so that heat may be furnished to an occupant on one side of the rear seat of the automobile. When the baffle plates are adjusted, as shown in dotted lines in Fig. 5, heating medium is baffled or deflected to both ends of the heater, and subsequently, the heating medium will pass slowly through the restricted or narrow openings between the rear edges of the baffle plates and the rear wall of the heater, and thence out through the pipe 29. By so retaining the gas and allowing it to pass off slowly, the radiation from the heating element 6 is considerably increased. In Figs. 1 and 2, only the heater 6 is provided with the baffling plates, while in Figs. 4 and 5, both heaters are provided with said baffle plates. By this arrangement, the baffling means of either one of the heaters may be eliminated, or if desired, both may be dispensed with. If desired, the baffle plates may be adjusted to converge together toward the rear, whereby a substantially V-shaped pocket is formed, into which the gas chokes and backs up through the pipe 21 into the heater 5, thereby increasing the radiation of the heater 5, when only the front seat of the automobile is occupied. From the foregoing, it can be seen that the heating medium may be easily controlled or regulated by a careful manipulation of the baffling plates, as the case may require.

The invention having been set forth, what is claimed as new and useful, is:—

1. In a heater for an automobile, a pair of heater casings having shallow chambers and provided with a pipe of communication, one heater casing in front of each seat of the automobile body, the exhaust pipe of the engine of the automobile having a bypass inlet pipe connection with the heater in front of the front seat, said bypass inlet pipe having means whereby the exhaust from the engine may be directed into the chamber of the forward heater casing, one of the heater casings having a pair of adjustable baffle plates mounted in its shallow chamber whereby the heating medium from the pipe of communication is baffled to the opposite ends of the chamber, and means for allowing the heating medium to pass off from the rear heater casing.

2. In a heater for an automobile, a pair of heater casings provided with hollow chambers and having a pipe of communication, one heater casing in front of each seat of the automobile, means of communication between the exhaust manifold from the engine and the forward casing and having baffling means to baffle the exhaust gas into the forward casing, a pair of adjustable baffle plates mounted in the hollow chamber of each casing, whereby the heating medium may be baffled to the opposite ends of the chamber, means for adjusting each baffle plate independently, and an outlet pipe to allow the exhaust to pass off from the rear heater casing.

In testimony whereof I have signed my name to this specification in the presence of two subscribing witnesses.

EUGENE BROWN.

Witnesses:
 DONALD BROWN,
 IKE BARRETT.